United States Patent [19]
Goto et al.

[11] 3,892,820
[45] July 1, 1975

[54] THERMOPLASTIC POLYAMIDE URETHANE UREA RESINS OF IMPROVED PROPERTIES

[75] Inventors: Hachiro Goto, Takatsuki; Atsushi Tanaka, Ibaraki; Shiho IIzuka, Ibaraki; Takahiko Kitamura, Ibaraki, all of Japan

[73] Assignee: Teijin Ltd., Osaka, Japan

[22] Filed: Oct. 2, 1973

[21] Appl. No.: 402,837

[52] U.S. Cl. .......... 260/858; 117/161 KP; 161/190; 260/32.6; 260/75 NH; 260/77.5 AM; 260/830 P; 260/835; 260/841; 260/849; 260/850; 260/857 UN; 260/857 PE; 260/857 L; 260/859
[51] Int. Cl.² ........................................ C08G 41/04
[58] Field of Search ....... 260/858, 75 NH, 77.5 AM

[56] References Cited
UNITED STATES PATENTS

| | | | |
|---|---|---|---|
| 3,245,961 | 4/1966 | Fetscher | 260/77.5 |
| 3,632,536 | 1/1972 | Iwakuna | 260/18 TN |
| 3,718,713 | 2/1973 | Tanaka | 260/858 |

*Primary Examiner*—Paul Lieberman
*Attorney, Agent, or Firm*—Sherman & Shalloway

[57] ABSTRACT

A thermoplastic polyamide urethane urea resin of improved properties which is derived from (A) a linear polyhydroxyl-terminated oligomer free from ethylene terephthalate unit, which has an average molecular weight of 400 to 4,000 and is liquid at 80°C., (B) a hydroxyl-terminated polyester oligomer having an average molecular weight of 500 to 4,000 and a melting point of 50° to 220°C., 55 to 100 mol% of its molecular chain consisting of ethylene terephthalate and ethylene naphthalate units, and in which ethylene terephthalate unit occupying 50 to 85 mol% of the polyester oligomer, (C) a linear polyamide oligomer having an average molecular weight of 400 to 4,000 and a melting pont of 100° to 200°C., at least 80% of the terminal groups thereof being amino groups, and (D) an organic diisocyanate; the composition of the reactions (A) through (D) satisfying the expressions below:

i. $0.8 \leqq (D)/(A) + (B) + (C)$ (mol ratio) $< 1$
ii. $(B) + (C)/(A)$ (weight ratio) $= 1.0 - 3.0$
iii. $(C)/(B) + (C)$ (weight ratio) $= 0.05 - 0.85$
and
iv. $(C)/(A) + (B) + (C) + (D)$ (weight %) $= 3 - 55$.

4 Claims, No Drawings

THERMOPLASTIC POLYAMIDE URETHANE UREA RESINS OF IMPROVED PROPERTIES

This invention relates to a thermoplastic polyamide urethane urea resin which exhibits improved properties.

There was previously proposed, in U.S. Pat. No. 3,718,713, a novel thermoplastic polyamide urethane urea resin which exhibits excellent resistances to water and dry-cleaning, is suitable for bonding, coating, and laminating applications, especially suitable as sewing bonding materials in such forms as film, tape, filaments, yarns, tows, knitted and woven fabrics, and non-woven fabrics; and also a process for making the novel resin.

The novel resin of the above proposal is derived from (A') a linear polyhydroxyl-terminated oligomer which is free from ethylene terephthalate unit, has an average molecular weight of 400 to 4,000, and is liquid at 80°C., (B') a linear hydroxyl-terminated polyester oligomer which has an average molecular weight of 400 to 3,000 and a melting point of 50°C. to 220°C., 35 to 95 percent by weight of the molecular chain thereof consisting of ethylene terephthalate units (C') a linear polyamide oligomer which has an average molecular weight of 400 to 4,000 and a melting point of 100° to 200°C., at least 80% of its terminal groups being amino groups, and (D') an organic diisocyanate.

The thermoplastic polyamide urethane urea resin of the previous proposal as above-specified exhibits excellent properties as a bonding agent which can melt-bond fibers or fiber assemblies within short periods, and also as a laminating or coating agent for the fibers, compared with then known resins for the similar usages.

We have further pursued the studies on that resin to discover that it tends to collect dust and is easily soiled during storage as, for example, a sewing bonding material in such a form as films, and that the materials are apt to cause mutual blocking even at normal temperature, rendering its maintenance cumbersome and difficult. Furthermore, the novel resin of the above proposal exhibit poor solubility in such solvents as dimethylformamide, dimethylacetamide, dimethylsulfoxide, and the like, at room temperature. Consequently, the resin hardly provides a high concentration solution of high stability at room temperature, i.e., a high concentration solution which would not gel at room temperature. Again the chips or pellets of the starting linear polyester oligomer relatively easily agglomerate even at room temperature, making its handling difficult.

We whereupon engaged in the studies for overcoming the foregoing defects and providing a thermoplastic polyamide urethane urea resin fully retaining, or occasionally having improved, adhesiveness, bonding ability, water resistance, and dry-cleaning resistance. As the result, we came to known that by replacing the reactant (B') of aforesaid U.S. Pat. No. 3,718,713 by the below-specified linear polyester oligomer (B), a novel thermoplastic polyamide urethane urea resin free from the foregoing defects and disadvantages can be obtained.

Accordingly, an object of the present invention is to provide a novel thermoplastic polyamide urethane urea resin having the above-described improved properties, and a process for producing the same.

Still many other objects and advantages of the present invention will become apparent from the following specifications.

The above objects are achieved by the present invention wherein the novel resin is produced by reacting the following components (A) through (D), under the conditions (i) through (iv) in combination:

A. a linear polyhydroxyl oligomer having at both terminals one hydroxyl group each, which is free from ethylene terephthalate unit, has an average molecular weight of 400 to 4,000, and is liquid at 80°C., B. a linear polyester oligomer having one hydroxyl group each at both terminals, a molecular weight of 500 to 4,000, and a melting point of 50° to 220°C., 55 to 100 mol% of the molecular chain thereof consisting of ethylene terephthalate and ethylene napathalane units, said ethylene trephthalate units occupying 50 to 85 mol% of the linear polyester oligomer, C. a linear polyamide oligomer having an average molecular weight of 400 to 4,000 and a melting point of 100° to 200°C., at least 80% of the terminal groups thereof being amino groups, and D. an organic diisocyanate;

the composition of the reactants (A) through (D) satisfying the expressions below:

i. $0.8 \leq (D)/(A) + (B) + (C)$ (mol ratio) $< 1$, ii. $(B) + (C)/(A)$ (weight ratio) $= 1.0 - 3.0$, iii. $(C)/(B) + (C)$ (weight ratio) $= 0.05 - 0.85$, and iv. $(C)/(A) + (B) + (C) + (D)$ (weight percent) $= 3 - 55$.

It is known to produce a thermoplastic polymer by reacting a compound having an active hydrogen atom with a polyisocyanate compound, but a polymer derived from the above-specified four components has never been produced in the past.

Examples of the linear polyhydroxyl oligomer (A) include polyalkylene ether glycols obtained through polymerization of ethylene oxide, trimethylene oxide, tetrahydrofuran; and substituted compounds of the foregoing such as 1,2- propylene oxide; polyester glycol obtained by reacting aliphatic dicarboxylic acids such as succinic acid, glutaric acid, adipic acid, suberic acid, azelaic acid, and sebacic acid, or lower alcohol esters thereof (for example, dimethyl esters) with molar excess of glycols such as aliphatic glycols selected from ethylene glycol, 1,2-propylene glycol, trimethylene glycol, tetramethylene glycol, hexamethylene glycol, diethylene glycol, triethylene glycol, and neopentyl glycol; polyester glycols partly containing phthalic acid, isophthalic acid, or xylene glycol; and mixtures of the foregoing. Of the above-named polyhydroxyl compounds, those preferred consist mainly of aliphatic components, have the average molecular weight ranging from 400 to 4,000, preferably 800 to 3,000, and are liquid at 80°C., preferably also at 60°C.

In the linear polyester oligomer (B) hydroxyl-terminating at both ends, 55 to 100 mol% of its molecular chain consists of ethylene terephthalate and ethylene naphthalate units, said ethylene terephthalate units occupying 50 to 85 mol% of the oligomer.

Such an oligomer (B) can be derived, for example, from an acid component of which at least 50 mol% is terephthalic acid and/or a lower alcohol ester thereof, and 5 to 45 mol% is a naphthalenedicarboxylic acid and/or a lower alcohol ester thereof; and a molar excess of a glycol or glycol component.

The above acid component may contain, besides the afore-named two acids, a minor amount, such as no ore than 40 mol%, of other acid or acids. Examples the acids which may be so concurrently used include phthalic acid, 2-methylterephthalic acid, 4-ethylisophthalic acid, phthalic acid, p-(β-hydroxyethoxy)benzoic acid, 4,4'-diphenylcarboxylic acid, succinic acid, glutaric acid, adipic acid, suberic acid, sebacic acid, azelaic acid, fumaric acid, maleic acid, and lower alcohol esters thereof.

As the glycol component, normally ethylene glycol is employed, which may be concurrently used with other glycol or glycols such as, for example, propylene glycol, tetramethylene glycol, hexamethylene glycol, neopentyl glycol, and diethylene glycol.

The linear polyester oligomer (B) has an average molecular weight ranging from 500 to 4,000, and a melting point within the range of 50° to 220°C.

As an example of preferred linear polyester oligomer (B), a polyester of which at least 50 mol% is made of ethylene terephthalate unit and 5 to 45 mol%, of ethylene naphthalate unit, and which has a melting point within the range of 60° to 220°C. can be named. More preferably, at least 60 mol% of the polyester is provided by ethylene terephthalate unit and 5 – 40 mol%, of ethylene naphthalate unit, and the polyester has a molecular weight of 1,000 to 3,000, and a melting point 60° to 200°C. The most preferred polyester, furthermore, consists of at least 60 mol% of ethylene terephthalate unit, 5 – 38 mol% of ethylene naphtalate unit, and 2 – 35 mol% of other acid or acids such as isophthalic acid, adipic acid, sebacic acid, and azelaic acid; and has a molecular weight of 1,000 – 3,000, and melting point of 60° – 190°C. When the terephthalic acid residue occupies less than 50 mol% of the polyester, the bonding strength of the product resin is reduced, and the product becomes sticky. Whereas, if the naphthalenedicarboxylic acid residue content exceeds 45 mol%, the melting point of the product rises to impair the bonding efficiency. On the other hand, if it is less than 5 mol%, no improvement in the product's properties is achieved.

As the naphthalenedicarboxylic acids, various iomers can be used, among which 2,6-, 2,7-, 2,4-, and 1,4-naphthalenedicarboxylic acids being preferred. Inter alia, 2,6-naphthalenedicarboxylic acid achieves the best results.

The linear polyamide oligomers (C) can be formed, for example, by copolymerizing diamines with dibasic acids, derivatives thereof, omegaamino acids, or cyclic amides. The diamines are used at a molar excess to the carboxyl groups, so that the most of the end groups of the oligomer, preferably at least 80%, will become amino groups. Whereas, examples of useful diamines include aliphatic amines such as ethylenediamine, methylenediamine, tetramethylenediamine, pentaethylenediamine, hexamethylenediamine, heptaethylenediamine, octamethylenediamine, nonamethylenediamine, and decamethylenediamine; derivatives of the above diamines such as 3-methoxyhexamethylenediamine; cyclic diamines such as 1,3-cyclohexanediamine, 1,4-cyclohexanediamine, 3-hexahydroxylylenediamine, and m-xylenediamine; and the diamines obtained by substituting an ether linkage for the methylene group of said aliphatic and cyclic amines.

Examples of the dibasic acids to be copolymerized with the diamines include aliphatic dicarboxylic acids such as oxalic, succinic, glutaric, adipic, pimelic, suberic, azelaic, and sebacic acids, and lower alcohol esters of such acids; and hetero atom-containing dicarboxylic acids or cyclic dicarboxylic acids such as terephthalic, methylterephthalic, hexahydroterephthalic, isophthalic, methylisophthalic, paraxylylenedicarboxylic, and isocinchomeronic acids.

Examples of the omega-amino acids include epsilon-aminocaproic, omega-aminoheptanoic, omega-aminononanoic, and omega-aminoundecanoic acids; and lower alcohol esters of such acids.

Examples of useful cyclic amides include epsilon-caprolactam and laurolactam.

The polyamide oligomer (C) used in the invention may also be obtained through partial alkylation of nitrogen atoms of the amide linkage, or copolymerization of an N-alkyl polyamide. The oligomer (C) has a melting point between 100° to 200°C., preferably 130° to 180°C., and an average molecular weight of 400 to 4,000, preferably from 800 to 3,500.

It is particularly preferred to employ binary to quaternary copolyamide oligomers which are derived from $C_6 - C_{12}$ lactams and/or $C_6 - C_{12}$ omega-amino acids and/or $C_6 - C_{12}$ dicarboxylic acids, and $C_6 - C_{12}$ diamines, and which have the average molecular weights ranging from 800 to 3,500, and melting points within the range of 120° to 170°C., at least 80% of their terminal groups at both ends being amino groups.

The organic diisocyanate (D) to be used as the fourth reactant according to the present invention may be aliphatic, alicyclic, or aromatic, which can be expressed by the formula below:

$$OCNRNCO$$

in which R is selected from a group consisting of aliphatic, alicyclic, and aromatic residues.

The diisocyanate may be used singly or plural diisocyanates can be used as a mixture.

Preferred diisocyanates are those in which the R's in the above formula are $C_6 - C_{12}$ aliphatic residues. Examples of such diisocyanates include hexamethylene diisocyanate, dimethylhexamethylene diisocyanate, trimethylhexamethylene diisocyanate, m-xylylene diisocyanate, and p-xylylene diisocyanate.

Of the diisocyanates containing aromatic residues, those in which the residues contain six to 16 carbons are preferred. The carbons may be substituted by halogen atoms, lower alkyl, or lower alkoxy groups. Examples of such aromatic diisocyanates include 2,4-tolylene diisocyanate a mixture of 2,4-tolylene diisocyanate (80 wt.%) with 2,6-tolylene diisocyanate (20 wt.%), tetramethylphenylene diisocyanate, diphenylmethane-4,4-diisocyanate, m-phenylene diisocyanate, p-phenylene diisocyanate, naphthalene-1,5-diisocyanate, and diphenyl-4,4'-diisocyanate.

Also the preferred alicyclic residues as the R's of the organic diisocyanates are those of six to 13 carbon atoms, examples of such diisocyanate including isophorone diisocyanate and dicyclohexylmethane diisocyanate.

Thus, the polyhydroxyl oligomer (A), the polyester oligomer (B), and polyamide oligomer (C), having the molecular weights and melting points within the respectively specified ranges are suitably chosen according to the invention.

The molar ratio of (D) to the sum of (A), (B), and (C) should be less than 1, preferably within the range specified below:

i. $0.8 \leq (D)/(A) + (B) + (C)$ (molar ratio) $< 1$

The reducing specific viscosity ($\nu sp/c$) of the formed polymer should be no less than 0.45 and no more than 1.40, preferably from 0.5 to 1.2, particularly from 0.6 to 1.0. When the above molar ratio becomes 1.0 or above, the product polymer is no more thermoplastic. Particularly when the polymer is to be used as hot melt to serve as a bonding agent, difficulties are caused because the polymer becomes hard-meltable and has a raised melting temperature. On the other hand, if the molar ratio is less than 0.8, the product polymer has a low degree of polymerization, insufficient cohesive force, and a reduced bonding ability.

The weight ratio of the sum of (B) and (C) to (A) should be as follows:

ii. $(B) + (C)/(A)$ (weight ratio) $= 1.0 - 3.0$, preferably $1.0 - 2.5$, particularly $1.2 - 2.0$. The optimum results are obtained when this ratio is within the range of $1.3 - 1.8$.

When the weight ratio exceeds 3.0, the product exhibits insufficient softness and unsatisfactory for the use as bonding agent for fiber. Whereas, if it is less than 1.0, concentration of affinitive segment becomes insufficient, and the product's bonding ability is reduced. Furthermore, the product exhibits poor resistances to water and solvent, and becomes tacky.

The thermoplastic polyamide urethane urea resin of the invention can be made by reacting the already specified four components. The reaction can be effected in various manner. For example, the oligomer (C) is mixed with the organic diisocyanate (D) and reacted, and then the oligomers (A) and (B) are added to the reaction system to be reacted. However, because the reaction mixture tends to gel at the time of mixing the components (C) and (D), such an embodiment is not quite satisfactory. Accordingly, following practices are more preferred.

1. (A), (B), and (C) are mixed, and then (D) is mixed with the first-formed mixture.
2. (A) and (B) are mixed, and then (C) and (D) are separately added and mixed by the oroder stated.
3. (A) and (D) are mixed and reacted, and the resulting prepolymer is mixed with a mixture of (B) and (C).
4. (A) and (D) are mixed, and the resulting prepolymer is mixed with (B), and then with (C).

It is also permissible to use any of the component or components as dividends. To wit, taking an example of above embodiment (4), (A) and (D) are first mixed and reacted, and the resulting prepolymer is mixed then with a portion of (B), and finally the reaction mixture is reacted with a mixture of the remainder of (B) and (C). In all of the embodiments the molar ratio of (D) to the sum of (A), (B), and (C) should be less than 1, preferably from 0.80 to 0.98.

According to the above method (1), the three types of oligomers (A), (B), and (C) are mixed and heated, and the mixture is dehydrated and dried at $80° - 120°C$. under $2 - 10$ mmHg. Then the organic diisocyanate (D) is added to the system in nitrogen atmosphere with vigorous stirring, to be reacted with the dry mixture. As aforesaid, the molar ratio of (D) to the sum of (A), (B), and (C) in the reaction system should be less than 1, preferably from 0.80 to 0.98.

In the above mentioned (3), the polyhydroxyl compound (A) is reacted with a molar excess of an organic diisocyanate or diisocyanates (D), to form a linear polyurethane prepolymer (A'') which is terminated with an isocyanate group at the both ends. The reaction is effected by the steps of first heating the polyhydroxyl compound (A) at the temperatures ranging from 80° to 120°C. under a pressure of 2 to 10 mmHg, to dehydrate and dry the same, and then adding thereto a molar excess of the organic diisocyanate (D), preferably 1.5 to 2.0 mols of the latter per mol of the polyhydroxyl compound (A). The resulting polyurethane prepolymer (A'') terminating with an isocyanate group at both ends is then mixed and reacted with the oligomers (B) and (C) in nitrogen atmosphere. In that occasion, the isocyanate equivalent of the polyurethane prepolymer (A'') should be less than the equivalent of the oligomers (B) and (C).

In any of the above embodiments (1) through (4), the polyamide oligomer (C) should be such that in which the greatest portion, preferably at least 80%, of both end groups are amino groups, the carboxyl group content never exceeding 20%. When the carboxyl group content is more than 20%, undesirable side reactions tend to occur during the reaction of the components (A) with (D). Especially when it is desired to obtain a polymer of high degree of polymerization containing a sufficient amount of the oligomer (C), such a high carboxyl group content of the oligomer (C) makes it difficult for the product resin to exhibit thermoplastic properties.

The appropriate weight ratio of (C) to the sum of (B) and (C) can be defined by the equation below:

iii. $(C)/(B) + (C)$ (weight ratio) $= 0.05 - 0.85$.

The preferred range is from 0.1 to 0.6, particularly from 0.15 to 0.4, inter alia, $0.18 - 0.35$. When this ratio is less than 0.05, the product resin comes to exhibit insufficient solvent resistance and bonding ability to cotton, rayon, linen, and nylon. Whereas, if it exceeds 0.85, the resin's adherability to polyester becomes poor, and objectionably high bonding temperature is required.

The content of the polyamide component (C) in the polymer derived from the four specified components should be within the range defined below:

iv. $(C)/(A) + (B) + (C) + (D)$ (weight %) $= 3 - 55$. The preferred range is from 5 to 40%, particularly $7 - 25$%, inter alia, $8 - 18$% by weight.

When the content is less than 3%, the polymer exhibits poor solvent resistance and insufficient adherability to cotton, rayon, linen, and nylon. Whereas, if it is higher than 55%, the polymer shows insufficient bonding strength to polyester, and the bonding temperature must be disadvantageously raised.

Accordingly to the present invention, the molecular weights of the oligomers (A), (B), and (C) should be within the already specified ranges. When they are lower than the respectively specified ranges, the advantageous properties of the product resin attributable to each of the components, such as water resistance, solvent resistance, bonding ability, resilience, and softeness, are lost. Whereas, if a molecular weight or weights of any of the oligomers (A), (B), and (C) are excessively high, the polymer-forming reaction fails to progress smoothly, the bonding temperature must be raised, and suppleness of the polymer is lost.

The reactions of the oligomers (A), (B), and (C), with the organic diisocyanate (D) can be performed in the molten state, or in an inert solvent such as dimethylformamide, dimethylacetamide, dimethylsulfoxide, N-methyl-2-pyrrolidone, or dioxane. This latter embodiment is very convenient for delicate controlling of the reaction as well as for direct preparation of adhesive solutions.

The thermoplastic polyamide urethane urea resin of the present invention is useful for hot melt bonding of fibers. Or, the resin can be applied onto the surfaces or interfaces of fibers and fabrics in the form of film, yarn, powder, etc., and subsequently hot-pressed to effect the bonding of the latter materials. Furthermore, the resin is useful for durable coating, printing fabric reinforcement, as well as for bonding and coating of plastics, particularly of shaped articles of polyester. The resin is particularly valuable for adhesion or bonding of fibers, because the same exhibits bonding ability for practically all types of fibers.

The thermoplastic polymer obtained in accordance with the subject process can be blended with plasticizer, antioxidant, stabilizer against ultraviolet rays, etc. Also the polymer can be blended with many other types as the occasion demands, such as polyurethane, polyvinyl chloride, butyral, polyester, polyamide, phenoxy resin, epoxy resin, polyphenyleneether, polyethylene, ethylene-vinyl acetate copolymer, vinyl chloride-vinyl acetate copolymer, polyvinyl acetate, amino resins; phenolic resins, rosin and modified resins, etc.

The average molecular weights and melting points appearing in this specification were measured by the following methods.

Linear polyhydroxyl oligomer (A):

1. Measurement of hydroxyl value (JIS K-3342-961)

Approx. 1 g of the specimen was taken into a flask, and to which 5 ml of a reagent (of 100 ml of a pyridine solution containing 20 g of acetic anhydride) was added. The flask was immersed in a glycerine bath, maintained at 95° – 100°C. for an hour, and then cooled to room temperature. One ml of distilled water was added into the flask under shaking, and the flask was again immersed in the glycerine bath for 10 minutes. The system was thus heated to 95 – 100°C., and again cooled to room temperature. Using phenolphthalein as the indicator, the system was titrated with a one-half-N potassium hydroxide solution (one liter of solution of 28.05 g of potassium hydroxide in a 9:1 mixture of benzyl alcohol and methyl alcohol).

Separately a blank test was carried out, and the hydroxyl value of the specimen was calculated according to the equation below:

$$HV = (B - C) \times 28.05/A + NV$$

in which,
HV: hydroxyl value
A: the weight in grams of the specimen
B: the amount in milliliters of 1/2-N potassium hydroxide solution used in the blank test
C: the amount in milliliters of 1/2-N potassium hydroxide solution consumed by the titration and
NV: neutralization value.

2. Measurement of carboxyl value

Approx. 1 g of the specimen was taken into a flask, and to which 50 ml of benzyl alcohol was added. The mixture was heated to 70°C. to form a homogeneous solution, which was then cooled to room temperature. The system was titrated with a 1/100-N potassium hydroxide solution (1 liter of a solution of 0.561 g of potassium hydroxide in a 9:1 mixture of benzyl alcohol and methyl alcohol), using phenolphthalein as the indicator.

Separately a blank test was performed, and the carboxyl value was calculated by the equation below:

$$AV = (C - B)/A \times 0.561$$

wherein
AV: carboxyl value,
A: the weight in grams of the specimen,
C: the amount in milliliters of 1/100-N potassium hydroxide solution consumed by the titration, and
B: the amount in milliliters of 1/100-N potassium hydroxide solution used in the blank test.

3. The molecular weight (NW) of the linear polyhydroxyl oligomer (A) was calculated according to the equation below, in which the AV and HV are the carboxyl value and hydroxyl value, respectively, as determined by the above-described methods.

$$MW = 56.11/AV + HV \times 2000$$

Linear polyester oligomer (B)

The hydroxyl and carboxyl values were determined by the methods described in *Macromol. Chem.* 26, 234 (1958), and the molecular weight was calculated by inserting the measured values to the same equation used for determining the molecular weight of the linear polyhydroxyl oligomer (A).

Linear polyamide oligomer (C)

1. Determination of amino concentration (equivalents/$10^4$g of polymer)

Approx. 1 of the specimen was taken into a flask, and to which 25 g of phenol was added, and heated to 70°C. The resulting solution was diluted with 12.5 g of ethyl alcohol and 12.5 g of distilled water, and cooled to room temperature. Then the solution was titrated conductometrically with 1/2-N hydrochloric acid. The $NH_2$ concentration was calculated from the equation below:

$$NH_2 \text{ concentration} = 0.5 \, C/A \times 10$$

in which,
A: the weight in grams of the specimen,
and
C: the amount in milliliters of 1/2 - N hydrochloric acid consumed by the titration.

2. Determination of carboxyl concentration (equivalents/$10^4$ g of polymer)

Approx. 1 g of the specimen was taken into a flask, and to which 50 ml of benzyl alcohol was added, and heated to 70°C. The resulting solution was cooled to room temperature, and titrated with 1/100 - N potassium hydroxide solution (1 liter of a solution of 0.561 g of potassium hydroxide in a 9:1 mixture of benzyl alcohol and methyl alcohol), using phenolphthalein as the indicator.

Also a blank test was performed separately, and the carboxyl (COOH) concentration was calculated from the equation below.

$$COOH \text{ concentration} = (C - B) \times 0.01/A \times 10$$

in which,
A: the weight in grams of the specimen,
B: the amount in milliliters of 1/100 - N potassium hydroxide solution used in the blank test, and
C: the amount in milliliters of 1/100 - N potassium hydroxide solution consumed by the titration.

The molecular weight (MW) of the linear polyamide oligomer (C) was calculated by the equation below:

$$MW = 2/[NH_2] + [COOH] \times 10^4,$$

in which [NH$_2$] and [COOH] denote the concentration of amino group and carboxyl group respectively, by the unit of equivalents/10$^4$ g of the polymer as above-determined.

The melting points of those oligomers were determined with a micro melting point tester, raising the temperature of the specimen at a rate of 3°C. per minute.

Hereinafter the invention will be more specifically explained with reference to the following working Examples, in which the blocking property of starting linear polyester oligomer; tackiness, gelling concentration, dry bonding strength, wet bonding strengths (water and perchloroethylene), and bonding temperature, of the produced thermoplastic polyamide urethane urea resin; were determined by the following methods.

a. Blocking property of starting linear polyester oligomer:

1 Kilogram of the sample oligomer which passed through a 5-mesh sieve was placed in a beaker, and left in a 30°C. thermostat for 30 days. Then the sample was again sieved with the 5-mesh sieve. If all of the sample could pass the sieve, the blocking of the sample was zero, while if it entirely remained in the sieve, the degree of blocking was denoted as 100.

b. Tackiness of thermoplastic polyamide urethane urea resin:

Two pieces of each 150-$\mu$thick, 100-mm wide and 100-mm long adhesive polymer film were superposed, sandwiched between two sheets of each 100 mm × 100 size glass plates, and left in a 30°C. thermostat for 24 hours under a load of 100 g/cm$^2$. Then the strength required for separating the two sheets of the polymer film was measured.

c. Gelling concentration of thermoplastic polyamide urethane urea resin:

The sample adhesive polymer was dissolved in 2:1 (by weight) mixture of dimethylacetamide and dimethylformamide under heating at 100°C., and the solution was left in a 30°C. thermostat for 48 hours to be determined of the gelling concentration.

d. Dry bonding strength:

A piece of sample adhesive film (150$\mu$ × 25 mm × 100 mm) was inserted between the materials of each 50 mm × 100 mm in size to be adhered, which were then heat-pressed for 15 seconds under a load of 4 lbs./2.5 × 10 cm$^2$, using an AATCC type scorch tester which could effect heating of both top and bottom surfaces. Thus prepared adhered pieces were peeled off with a pull strength of 40 mm/min., and the strength required was measured with an autograph, which is given as the dry bonding strength by the unit of kg/cm.

e. Wet bonding strength (water):

The sample pieces adhered by the identical manner with above were immersed in water for an hour, and the peeling strength required for separating the wet pieces was similarly measured with an autograph.

f. Wet bonding strength (perchloroethylene):

The sample pieces adhered by the identical manner with above were immersed in perchloroethylene for an hour, and the peeling strength required for separating the pieces moist with perchloroethylene was similarly measured with an autograph.

(g) Bonding temperature:

The temperature of the hot plate in the AATCC type scorch tester.

Also in the following Examples, parts are by weight unless otherwise specified.

EXAMPLE 1

Sixty parts of polyethylenepropylene adipate (A) (ethylene glycol/propylene glycol = 70/30 by part) having an average molecular weight of 1,200 was heated to 100°C. in an atmosphere of N$_2$ gas, and dehydrated and dried for 30 minutes under a reduced pressure of 3-mm Hg. Then 18 parts of xylylene diisocyanate (D) (meta-isomer/para-isomer = 80/20 by part) was added to the dried (A), and allowed to react at 100°C. for 60 minutes with stirring, in the atmosphere of N$_2$ gas. Thus an isocyanate-terminated polyurethane prepolymer derived from said adipate (A) and xylylene diisocyanate (D) was obtained.

Separately, 69 parts of a polyester oligomer (B) having an average molecular weight of 1,780, OH-value of 62.7, COOH-value of 0.3, and a melting point of 90°–100°C, and 22 parts of a polyamide oligomer (C) having an average molecular weight of 2,000, NH$_2$ content of 9.75 eq./10$^4$g, COOH content of 0.24 eq./10$^2$g, and a melting point of 142°C., were together dissolved in 113 parts of dehydrated dimethylacetamide by heating in a nitrogen atmosphere. The oligomer (B) was composed of 15 mol% of naphthalene-2,6-dicarboxylic acid, 65 mol% of terephthalic acid, 20 mol% of isophthalic acid as the acid component reacted with ethylene glycol. Also the oligomer (C) was composed of 30 parts of 6-nylon, 35 parts of 6,6-nylon, and 35 parts of 6,10-nylon. To the solution 0.2 g of dibutyltin dilaurate was added as the catalyst, and further the first-mentioned polyurethane prepolymer was added under vigorous stirring at 140°C. The reaction was thus performed for 60 minutes at approximately 140°C.

In the above-described embodiment, the composition of the reaction of the reaction system was as follows.

i. (D)/(A)+(B)+(C)(mol ratio) = 0.96
ii. (B)+(C)/(A)(weight ratio) = 1.52
iii. (C)/(B)+(C)(weight ratio) = 0.24
iv. (C)/(A)+(B)+(C)+(D) (weight %) = 13.0

The adhesive solution thus obtained as the reaction product was subjected to the property tests, with the results given in Table 1 below.

As a control run, the foregoing Example 1 was repeated except that the polyester oligomer (B) was replaced by an oligomer containing none of the unit derived from naphthalene-2,6-dicarboxylic acid, but which was composed of 65 mol% of terephthalic acid and 35 mol% of isophthalic acid reacted with ethylene glycol. The test results of the so obtained adhesive solution are given in Table 1 below.

Table 1

| Property | Example 1 | Control 1 |
| --- | --- | --- |
| (a) Blocking property of starting linear polyester oligomer | 0 | 80 |
| (b) Woven fabric-to-fabric bonding strength (polyethylene terephthalate/cotton = | 4.1 | 4.0 |

Table 1—Continued

| Property | Example 1 | Control 1 |
|---|---|---|
| 65/35) (kg/cm) | | |
| c) Knit polyethylene terephthalate-to-terephthalate dry bonding strength (kg/cm) | 2.8 | 2.8 |
| d) Do. wet bonding strength (H₂O, kg/cm) | 2.8 | 2.5 |
| e) Do. wet bonding strength (perchloroethylene, kg/cm) | 1.6 | 1.6 |
| f) Tackiness of product urea resin (g/cm) | 0 | Film breakage, peeling impossible |
| g) Gelling concentration (%) | 35 | 15 |
| h) Bonding temperature (°C.) | 145 | 140 |
| i) $\eta sp/C$ | 0.71 | 0.70 |

EXAMPLES 2 – 7 AND CONTROLS 2 – 13

Example 1 was repeated except that the types and quantities of the oligomers (A), (B), and (C) were varied for each run. The formed thermoplastic polyamide urethane urea resins as listed in Table 2 were measured of their properties similarly to Example 1, with the results as given in Table 2'.

In Table 2 and 2', the correspondences of the abbreviations and compounds are as follows:

TA: terephthalic acid
PET: polyethylene terephthalate
NA: naphthalene-2,6-dicarboxylic acid
IA: isophthalic acid
PG: propylene glycol
EG: ethylene glycol
PTMG: polytetramethyleneglycol
HMDA: hexamethylenediamine
PEA: polyethylene adipate
PBA: polybutylene adipate
PEPA: polyethylenepropylene adipate
PNHA: polyneopentylhexamethylene adipate
XDI: xylylene diisocyanate (meta-isomer/para-isomer = 80/20)
MDI: diphenylmethane-4,4'-diisocyanate
L: caprolactam
AA: adipic acid
SA: sebacic acid Table 2

| | Run No. | Example 2 | Example 3 | Example 4 | Example 5 | Example 6 | Example 7 |
|---|---|---|---|---|---|---|---|
| Polyhydroxyl compound (A) | type | PEPA* | PEA | PTMG | PEA | PNHA** | PBA |
| | molecular weight | 1650 | 1100 | 1370 | 1060 | 2000 | 1800 |
| | amount used (part) | 82.5 | 55 | 68.5 | 53 | 100 | 90 |
| Polyester oligomer (B) | TA (mol %) | 65 | 65 | 70 | 70 | 70 | 65 |
| | NA (mol %) | 35 | 10 | 10 | 10 | 8 | 8 |
| | IA (mol %) | 0 | 25 | 20 | 20 | 22 | 27 |
| | glycol | EG | EG | EG | EG | EG | EG |
| | molecular weight | 2500 | 1700 | 1900 | 1700 | 2850 | 2850 |
| | melting point (°C.) | 105–115 | 75–85 | 115–125 | 115–125 | 110–120 | 72–83 |
| | amount used (part) | 83.8 | 66.3 | 68.4 | 64 | 96.9 | 96.9 |
| Polyamide oligomer (C) | L (part) | 288 | 150 | 288 | 288 | 288 | 150 |
| | AA (part) | 107 | 98 | 107 | 107 | 107 | 98 |
| | SA (part) | 0 | 111 | 0 | 0 | 0 | 111 |
| | diamine | HMDA | HMDA | HMDA | HMDA | HMDA | HMDA |
| | molecular weight | 1700 | 2000 | 1700 | 1700 | 1700 | 1700 |
| | melting point (°C.) | 153 | 142 | 153 | 153 | 153 | 142 |
| | content of terminal NH₂ groups (%) | 97.7 | 97.5 | 97.7 | 96.5 | 97.7 | 97.6 |
| | amount used (part) | 28.1 | 22 | 23.8 | 21 | 27.2 | 27.2 |
| Diisocyanate (D) | type | XDI | XDI | MDI | XDI | XDI | MDI |
| | molecular weight | 188 | 188 | 250 | 188 | 188 | 250 |
| | amount used (part) | 18.2 | 18.2 | 24 | 18.3 | 18.5 | 24.5 |
| Conditions | (i) (D)/(A)+(B)+(C) (mol ratio) | 0.97 | 0.97 | 0.96 | 0.97 | 0.98 | 0.98 |
| | (ii) (B)+(C)/(A) (weight ratio) | 1.36 | 1.61 | 1.35 | 1.60 | 1.24 | 1.38 |
| | (iii) (C)/(B)+(C) (weight ratio) | 0.25 | 0.25 | 0.26 | 0.25 | 0.22 | 0.22 |
| | (iv) (C)/(A)+(B)+(C)+(D) (weight %) | 13.2 | 13.6 | 12.9 | 13.4 | 11.2 | 11.4 |

\* (PG/EG = 65/35)
\*\* (NG/HG = 50/50)

| | Control 2 | Control 3 | Control 4 | Control 5 | Control 6 | Control 7 | Control 8 | Control 9 | Control 10 | Control 11 | Control 12 | Control 13 |
|---|---|---|---|---|---|---|---|---|---|---|---|---|
| | PEA | PEA | PEPA*** | PEA | PEA | PBA | PBA | PEA | PEA | PEPA*** | PEA | PEA |
| | 1060 | 1060 | 1650 | 1100 | 1100 | 2000 | 850 | 1200 | 1060 | 1650 | 1060 | 1060 |
| | 53 | 53 | 82.5 | 55 | 55 | 100 | 42.5 | 60 | 53 | 82.5 | 53 | 53 |
| | 70 | 70 | (40) | 65 | 65 | 70 | 70 | 65 | 70 | 65 | 65 | 70 |
| | (0) | (2) | (55) | 10 | 10 | 10 | 10 | 10 | 10 | 10 | 10 | 10 |
| | 30 | 28 | 5 | 25 | 25 | 20 | 20 | 25 | 20 | 25 | 25 | 20 |
| | EG | EG | EG | EG | EG | EG | EG | EG | EG | EG | EG | EG |
| | 1700 | 1700 | 2500 | 1700 | 1700 | 1000 | 3000 | 1700 | 1700 | 1700 | 2000 | 1700 |
| | 174– | 168– | 130– | 75– | 75– | 115– | 118– | 75– | 115– | 75– | 75– | 115– |
| | 176 | 170 | 140 | 85 | 85 | 125 | 125 | 85 | 125 | 85 | 85 | 125 |
| | 65 | 64 | 83.8 | 51 | 66.3 | 37 | 120 | 81.6 | 8.5 | 81.2 | 10.0 | 59.5 |
| | 288 | 288 | 288 | 150 | 150 | 288 | 288 | 150 | 150 | 150 | 150 | 288 |
| | 107 | 107 | 107 | 98 | 98 | 107 | 107 | 98 | 98 | 98 | 98 | 107 |
| | 0 | 0 | 0 | 111 | 111 | 0 | 0 | 111 | 111 | 111 | 111 | 0 |
| | HMDA | HMDA | HMDA | HMDA | HMDA | HMDA | HMDA | HMDA | HMDA | HMDA | HMDA | HMDA |
| | 1700 | 1700 | 1700 | 2000 | 2000 | 1000 | 2800 | 1700 | 1700 | 2000 | 2800 | 1700 |
| | 153 | 153 | 153 | 142 | 142 | 150 | 154 | 142 | 142 | 142 | 145 | 153 |
| | 97.7 | 96.5 | 97.7 | 97.5 | 97.5 | 98.2 | 96.5 | 97.6 | 97.5 | 97.5 | 96.5 | (75.0) |
| | 21 | 21 | 28.1 | 22 | 22 | 12 | 28 | 3.4 | 76.5 | 4.5 | 126 | 25.5 |
| | XDI | XDI | XDI | XDI | XDI | MDI | MDI | XDI | XDI | MDI | MDI | XDI |
| | 188 | 188 | 188 | 188 | 188 | 250 | 250 | 188 | 188 | 250 | 250 | 188 |
| | 18.3 | 18.3 | 18.2 | 18.8 | 14.1 | 24 | 24.3 | 18.3 | 18.3 | 23.7 | 24.3 | 18.5 |
| | 0.97 | 0.97 | 0.97 | (1.1) | (0.75) | 0.96 | 0.97 | 0.97 | 0.97 | 0.95 | 0.97 | 0.97 |
| | 1.60 | 1.60 | 1.36 | 1.33 | 1.61 | (0.5) | (3.5) | 1.42 | 1.60 | 1.04 | 2.57 | 1.60 |
| | 0.25 | 0.25 | 0.25 | 0.30 | 0.25 | 0.26 | 18.9 | (0.04) | (0.90) | 0.05 | (0.93) | 0.30 |
| | 13.4 | 13.4 | 13.2 | 15.0 | 14.0 | 7.5 | 13.0 | (2.1) | 48.9 | (2.3) | (59.1) | 16.3 |

*** (PG/EG = 70/30)

Table 2'

| Properties \ Run No. | Example 2 | Example 3 | Example 4 | Example 5 | Example 6 | Example 7 |
|---|---|---|---|---|---|---|
| Gelling concentration (%) | 40 | 35 | 30 | 30 | 30 | 35 |
| Tackiness (g/cm) | 0 | 0 | 0 | 0 | 0 | 1 |
| sp/C | 0.75 | 0.73 | 0.71 | 0.75 | 0.83 | 0.84 |
| Bonding temp. (°C.) | 150 | 140 | 145 | 145 | 155 | 155 |
| Woven fabric-to-fabric (PET/cotton = 65/35) bonding strength (kg/cm) | 4.4 | 4.5 | 4.2 | 5.2 | 4.0 | 4.1 |
| Knit PET-PET bonding strength (kg/cm) | 3.1 | 3.0 | 2.8 | 3.6 | 3.8 | 3.5 |
| Do. after the knit good was immersed in water for an hour (kg/cm) | 3.1 | 3.0 | 2.8 | 3.6 | 3.7 | 3.6 |
| Do. after the knit good was immersed in perchloroethylene for an hour (kg/cm) | 1.8 | 1.7 | 1.6 | 2.0 | 1.9 | 1.9 |

| Control 2 | Control 3 | Control 4 | Control 5 | Control 6 | Control 7 | Control 8 | Control 9 | Control 10 | Control 11 | Control 12 | Control 13 |
|---|---|---|---|---|---|---|---|---|---|---|---|
| (15) | (15) | 35 | Gelled and could not be formed into film. | 35 | 30 | 30 | 35 | 30 | 35 | 30 | (15) |
| **** | (400) | 0 | | 0 | (300) | 0 | 3 | 0 | 3 | 0 | 0 |
| 0.77 | 0.76 | 0.75 | | (0.40) | 0.72 | 0.73 | 0.75 | 0.74 | 0.65 | 0.75 | 0.57 |
| 150 | 150 | 185 | | 140 | 135 | (190) | 135 | (200) | 135 | (210) | (220) |
| 4.5 | 4.4 | 4.0 | | (1.0) | 1.0 | 5.0 | 3.0 | 1.5 | 2.6 | 1.6 | 1.0 |
| 2.8 | 2.8 | (1.5) | | (0.8) | (1.0) | 3.5 | 3.0 | (1.0) | 2.8 | (1.0) | (0.8) |
| 2.5 | 2.6 | 1.5 | | 0.8 | 1.0 | 3.5 | 3.0 | 1.0 | 2.8 | 1.0 | 0.8 |
| 1.7 | 1.7 | 1.4 | | (0.3) | (0.4) | 2.2 | (0.4) | 0.9 | (0.3) | 0.9 | 0.7 |

**** Peeling impossible

The values in parentheses are those outside the ranges specified in this invention, or indicate the thereby caused unfavorable results.

We claim:

1. A thermoplastic polyamide urethane urea resin which is the reaction product of the four components as follows:
   A. A linear polyhydroxyl oligomer having a hydroxyl group at both terminals, which is free from ethylene terephthalate unit, has an average molecular weight of 400 to 4,000, and is liquid at 80°C.,
   B. a linear polyester oligomer having a hydroxyl group at both terminals, a molecular weight of 500 to 4,000, and a melting point of 50° to 220°C., 55 to 100 mol% of the molecular chain thereof consisting of ethylene terephthalate and ethylene-2,6-naphthalate units, said ethylene terephthalate unit occupying 50 to 85 mol% of the linear polyester oligomer, and said ethylene-2,6-naphthalate unit occupying 5 to 40 mol% of the linear polyester oligomer,
   C. a linear polyamide oligomer having an average molecular weight of 400 to 4,000, and a melting point of 100° to 200°C., at least 80% of the terminal groups thereof being amino groups, and
   D. an organic diisocyanate;

the composition of the reactants (A) through (D) satisfying the expressions as follows:
   i. $0.8 \leq (D)/(A)+(B)+(C)$ (mol ratio) $< 1$,
   ii. $(B) + (C)/(A)$ (weight ratio) $= 1.0 - 3.0$,
   iii. $(C)/(B) + (C)$ (weight ratio) $= 0.05 - 0.85$,
   and
   iv. $(C)/(A) + (B) + (C) + (D)$ (weight %) $= 3 - 55$.

2. A thermoplastic polyamide urethane urea resin of claim 1, in which the polyester oligomer (B) has a molecular weight of 1,000 to 3,000 and a melting point of 60° – 200°C., 65 to 100 mol% of the molecular chains thereof consisting of said ethylene terephthalate and said ethylene naphthalate units, in which the ethylene terephthalate unit is present in the amount of 60 – 85 mol% of the molecular chains.

3. A thermoplastic polyamide urethane urea resin of claim 1, in which the polyester oligomer (B) has a molecular weight of 1,000 to 3,000 and a melting point of 60° – 190°C., 65 to 98 mol % of the molecular chains thereof consisting of said ethylene terephthalate and said ethylene naphthalate units, in which the ethylene terephthalate unit occupying 60 – 80 mol % of the oligomer, and the balance of 2 to 35 mol % being provided by ethylene isophthalate unit, ethylene adipate unit, ethylene sebacate unit, or ethylene azelate unit.

4. A process for the preparation of a thermoplastic polyamide urethane urea resin, which comprises reacting.
   A. a linear polyhydroxyl oligomer having a hydroxyl group at both terminals, which is free from ethylene terephthalate unit, has an average molecular weight of 400 to 4,000, and is liquid at 80°C.,
   B. a linear polyester oligomer having a hydroxyl group at both terminals, a molecular weight of 500 to 4,000, and a melting point of 50° to 220°C., 55 to 100 mol% of the molecular chain thereof consisting of ethylene terephthalate and ethylene-2,6-naphthalate units, said ethylene terephthalate unit occupying 50 to 85 mol% of the linear polyester oligomer, and said ethylene-2,6-naphthalate unit occupying 5 to 40 mol% of the linear polyester oligomer,
   C. a linear polyamide oligomer having an average molecular weight of 400 to 4,000, and a melting point of 100° to 200°C., at least 80% of the terminal groups thereof being amino groups, and
   (D) an organic diisocyanate;

the composition of the reactants (A) through (D) satisfying the expressions below:
   i. $0.8 \leq (D)/(A)+(B)+(C)$ (mol ratio)$-1$,
   ii. $(B) + (C)/(A)$ (weight ratio) $= 1.0 - 3.0$,
   iii. $(C)/(B) + (C)$ (weight ratio) $= 0.05 - 0.85$,
   and
   iv. $(C)/(A) + (B) + (C) + (D)$ (weight %) $= 3 - 55$.

* * * * *